(12) United States Patent
Dominique et al.

(10) Patent No.: US 7,792,134 B2
(45) Date of Patent: Sep. 7, 2010

(54) METHOD AND APPARATUS FOR DETECTING AN UPLINK PACKET DATA CHANNEL IN A CDMA WIRELESS COMMUNICATIONS SYSTEM

(75) Inventors: Francis Dominique, Rockaway, NJ (US); Hongwei Kong, Denville, NJ (US); Ashok Armen Tikku, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 880 days.

(21) Appl. No.: 10/835,810

(22) Filed: Apr. 30, 2004

(65) Prior Publication Data

US 2005/0243855 A1 Nov. 3, 2005

(51) Int. Cl.
*H04B 7/216* (2006.01)
(52) U.S. Cl. .................. 370/441; 370/252; 370/320
(58) Field of Classification Search .............. 370/310, 370/320, 329, 342, 438, 439, 441
See application file for complete search history.

(56) References Cited

U.S. PATENT DOCUMENTS

| 6,094,465 | A * | 7/2000 | Stein et al. ............... 375/346 |
| 6,804,220 | B2 * | 10/2004 | Odenwalder et al. ....... 370/337 |
| 7,076,005 | B2 * | 7/2006 | Willenegger ............... 375/341 |
| 7,092,731 | B2 * | 8/2006 | Gopalakrishnan et al. ... 455/522 |
| 2003/0078008 | A1 | 4/2003 | Gruhn et al. ............. 455/67.1 |
| 2003/0086385 | A1 * | 5/2003 | Kwon et al. ............. 370/320 |
| 2003/0188252 | A1 | 10/2003 | Kim et al. ............... 714/779 |
| 2003/0202500 | A1 * | 10/2003 | Ha et al. ............... 370/342 |
| 2004/0043784 | A1 | 3/2004 | Czaja et al. ............ 455/522 |
| 2005/0002444 | A1 * | 1/2005 | Wei et al. .............. 375/147 |
| 2006/0245428 | A1 * | 11/2006 | Yanamoto et al. ........ 370/394 |

OTHER PUBLICATIONS

A. C. K. Soong, et al, "Forward High-Speed Wireless Packet Data Service in IS-2000—1XEV-DV," *IEEE Communications Magazine*, Piscataway, NJ, vol. 41, No. 8, (Aug. 2003), pp. 170-177.
S. Fontenelle, et al, "Blind Recognition of Retransmitted Packets for HARQ System," *IEEE Wireless Communications and Networking*, Piscataway, NJ, vol. 2, (Mar. 16, 2003), pp. 838-842.
European Search Report, Appl. No. 05252371.9-2415 PCT/, (Sep. 6, 2005).

* cited by examiner

*Primary Examiner*—Ricky Ngo
*Assistant Examiner*—Gary Mui
(74) *Attorney, Agent, or Firm*—John Ligon

(57) ABSTRACT

At a base station receiver in a CDMA wireless communications system, in order to reduce reliance on the parameter values transmitted on a packet data control channel (PDCCH) to properly detect the high speed packet data transmitted on a packet data channel (PDCH) with which the PDCCH is code-division-multiplexed, data detection is performed using different possible values for at least one of the parameters and determining if a data packet derived from the PDCH detected under the different values produces a detected data packet that passes a CRC check. If a data packet derived from the received PDCH using a possible parameter value passes the CRC check, then the data packet is delivered to the output and an ACK is transmitted back to the transmitting mobile terminal.

19 Claims, 8 Drawing Sheets

| Data Packet Size (bits) | SPID (0, 1 or 2) | Normal or Boost PDCH to PICH | PDCCH Binary Index | PDCCH Decimal Index |
|---|---|---|---|---|
| 174 | 00 | Normal | 000000 | 0 |
| 386 | 00 | Normal | 000001 | 1 |
| 770 | 00 | Normal | 000010 | 2 |
| 1538 | 00 | Normal | 000011 | 3 |
| 3074 | 00 | Normal | 000100 | 4 |
| 4610 | 00 | Normal | 000101 | 5 |
| 6146 | 00 | Normal | 000110 | 6 |
| 9218 | 00 | Normal | 000111 | 7 |
| 12290 | 00 | Normal | 001000 | 8 |
| 15362 | 00 | Normal | 001001 | 9 |
| 18434 | 00 | Normal | 001010 | 10 |
| 174 | 01 | Normal | 001011 | 11 |
| 386 | 01 | Normal | 001100 | 12 |
| 770 | 01 | Normal | 001101 | 13 |
| 1538 | 01 | Normal | 001110 | 14 |
| 3074 | 01 | Normal | 001111 | 15 |
| 4610 | 01 | Normal | 010000 | 16 |
| 6146 | 01 | Normal | 010001 | 17 |
| 9218 | 01 | Normal | 010010 | 18 |
| 12290 | 01 | Normal | 010011 | 19 |
| 15362 | 01 | Normal | 010100 | 20 |
| 18434 | 01 | Normal | 010101 | 21 |
| 174 | 02 | Normal | 010110 | 22 |
| 386 | 02 | Normal | 010111 | 23 |
| 770 | 02 | Normal | 011000 | 24 |
| 1538 | 02 | Normal | 011001 | 25 |
| 3074 | 02 | Normal | 011010 | 26 |
| 4610 | 02 | Normal | 011011 | 27 |
| 6146 | 02 | Normal | 011100 | 28 |
| 9218 | 02 | Normal | 011101 | 29 |
| 12290 | 02 | Normal | 011110 | 30 |
| 15362 | 02 | Normal | 011111 | 31 |
| 18434 | 02 | Normal | 100000 | 32 |
| 174 | 00 | Boost | 100001 | 33 |
| 386 | 00 | Boost | 100010 | 34 |
| 770 | 00 | Boost | 100011 | 35 |
| 1538 | 00 | Boost | 100100 | 36 |
| 3074 | 00 | Boost | 100101 | 37 |
| 4610 | 00 | Boost | 100110 | 38 |
| 6146 | 00 | Boost | 100111 | 39 |
| 9218 | 00 | Boost | 101000 | 40 |
| 12290 | 00 | Boost | 101001 | 41 |
| 174 | 01 | Boost | 101010 | 42 |
| 386 | 01 | Boost | 101011 | 43 |
| 770 | 01 | Boost | 101100 | 44 |
| 1538 | 01 | Boost | 101101 | 45 |
| 3074 | 01 | Boost | 101110 | 46 |
| 4610 | 01 | Boost | 101111 | 47 |
| 6146 | 01 | Boost | 110000 | 48 |
| 9218 | 01 | Boost | 110001 | 49 |
| 12290 | 01 | Boost | 110010 | 50 |
| 174 | 02 | Boost | 110011 | 51 |
| 386 | 02 | Boost | 110100 | 52 |
| 770 | 02 | Boost | 110101 | 53 |
| 1538 | 02 | Boost | 110110 | 54 |
| 3074 | 02 | Boost | 110111 | 55 |
| 4610 | 02 | Boost | 111000 | 56 |
| 6146 | 02 | Boost | 111001 | 57 |
| 9218 | 02 | Boost | 111010 | 58 |
| 12290 | 02 | Boost | 111011 | 59 |
| Reserved | Reserved | Reserved | 111100 | 60 |
| Reserved | Reserved | Reserved | 111101 | 61 |
| Reserved | Reserved | Reserved | 111110 | 62 |
| Reserved | Reserved | Reserved | 111111 | 63 |

METHOD AND APPARATUS FOR DETECTING AN UPLINK PACKET DATA CHANNEL IN A CDMA WIRELESS COMMUNICATIONS SYSTEM

TECHNICAL FIELD

This invention relates to wireless communications, and more particularly, to detecting at a base station the high-speed Packet Data Channel that is transmitted on the reverse link by a mobile terminal.

BACKGROUND OF THE INVENTION

Mobile terminals that are in accord with the latest 3GPP2 CDMA2000-1x EVDV standards (RevD) support high-speed uplink data transmission that allow partial retransmission of a transmitted data packet at the physical layer unlike previous releases which performed retransmission decisions at higher layers that incurred a greater latency. In accordance with these latest standards, high speed data transmission from the mobile terminal takes place over a Packet Data Channel (PDCH), which is code division multiplexed with a Packet Data Control Channel (PDCCH) and a Pilot Channel (PICH) for uplink transmission to the base station. At the mobile terminal, Cyclic Redundancy Check (CRC) bits are attached to a data packet that is to be transmitted. For example, a 16-bit CRC is appended to each data packet. The resultant combined data and CRC bits are turbo encoded and then interleaved, the latter to combat a correlated fading channel. The interleaved bits are then reorganized into N subpackets, where N is the total number of transmissions allowed for one data packet, which is three in accordance with the afore-noted standards. Each subpacket takes part or the entire data from the output of the interleaver. The rules for forming the subpackets for each data packet are known to the mobile terminal and to the base station if the data packet size is known. All subpackets associated with one data packet have the same size and can be overlapped. For one data packet, each transmission to the base station consists of one of the subpackets, which are consecutively numbered with a subpacket ID number (SPID) from 0 to N-1. If the mobile terminal does not receive an acknowledge message (ACK) from the base station, transmission by the mobile terminal continues one subpacket at a time until an ACK is received in response to a transmitted subpacket, or all N subpackets have been transmitted, whichever occurs first. If an ACK is not received after all N subpackets have been transmitted, the mobile terminal's higher layer then decides whether to resend the packet in smaller size packets or a same size packet again, subpacket-by-subpacket as was just done, or to just drop its attempt to transmit the packet.

In transmitting a packet to the base station, the mobile terminal first transmits subpacket number 0, which is modulated and code-division-multiplexed (CDM-ed) with the PICH and the PDCCH, with proper levels relative to the PICH. As will be discussed, the PDCCH transmitted with the PDCH includes information needed by the base station receiver to properly decode the subpacket. This information includes the SPID, the size of the input data packet, and an indication of a PDCH-to-PICH power ratio. At the base station, the received code-division-multiplexed signal is despread and demodulated to generate soft symbol metrics for the PDCH. If SPID=0, then the generated soft symbol metrics are passed through a deinterleaver and a turbo decoder to reform the bits within the transmitted data packet and its associated attached CRC bits. A CRC check is then performed on the decoded data bits to determine whether there is a match between the CRC calculated from those decoded data bits and the attached decoded CRC bits. If the CRC calculated from the received decoded data bits matches the decoded CRC (a CRC pass), it is assumed with high probability that the data bits have been received and decoded accurately. If there is not a match (a CRC fail), then it is assumed that the received data bits are not the same as the transmitted bits in the input data packet. The pass or fail result of the CRC is passed to the downlink ACK channel processing. If the CRC is a pass, then an ACK is sent to the mobile station; otherwise no ACK is sent to the mobile terminal.

If the mobile terminal detects an ACK from the base station over the downlink ACK channel, it considers the transmission to have been successful and processes the next data packet to be transmitted from the higher layer. If the mobile terminal does not receive an ACK, then it does not receive a new data packet from the higher layer and transmits the next subpacket, which has SPID=1, from the original transmitted data packet. At the base station this next received subpacket is despread and demodulated to generate soft symbol metrics. The soft symbol metrics are then subpacket-combined with the soft symbol metrics previously received for the subpacket having SPID=0. If subpacket SPID=0 and subpacket SPID=1 have overlapping data bits, accumulation of the soft symbol metrics is performed on the soft symbols corresponding to the overlapped bits. After combination, the resultant metrics are then deinterleaved and turbo-decoded. As before, a CRC check is performed on the resultant decoded bits. If the CRC results in a pass, the base station sends an ACK to the mobile terminal; otherwise the base station is silent. If a CRC fail results again, the mobile terminal transmits its last remaining subpacket, which has SPID=2, to the base station and the process is repeated again. This time the subpacket combining at the base station undoes the packet formation at the mobile station plus the combining, if necessary, over subpackets SPID=0, 1 and 2.

As afore-noted, in accordance with 3GPP2 standards, the maximum number, N, of subpacket transmissions for one data packet is three. Thus, if a CRC fail still results after the third subpacket transmission, the higher layer will decide whether to abandon transmission of this data packet or to transmit it again. In either case, the next data packet received from the higher layer, be it this same data packet being provided for retransmission the same data in smaller size packets or a totally different and new packet, is treated as a new packet at the physical layer.

As previously noted, the PDCCH carries information needed by the base station to properly recover the transmitted subpacket on the PDCH and from that or multiple subpackets, the transmitted data packet. In the 3GPP2 system, subpacket formation is dependent on the input data packet size. In addition, the maximum number of transmissions of subpackets per data packet is a fixed parameter in the 3GPP2 standards. As noted above, that number is three. In addition an indication of the PDCH-to-PICH power ratio is required for turbo decoding. In 3GPP2 standards, there are only two possible PDCH-to-PICH power ratios for one data packet size. Further, in order to properly decode a subpacket, its SPID needs to be known to enable the receiver to properly combine a de-segmented packet with the one or two previously received subpackets if its SPID is 1 or 2, respectively. Thus, in order to properly detect the PDCH and recover the transmitted data packet, the following information needs to be associated with each received PDCH: the data packet size; the subpacket SPID; and the PDCH-to-PICH power ratio. As is specified in the standards, this information is carried by the PDCCH in order to assist PDCH processing and is transmitted simultaneously with the PDCH subpacket whose information it is carrying and with which it is code-division-multiplexed.

At the base station receiver, the PDCCH carrying this needed information is demodulated and decoded prior to processing of the PDCH to enable the receiver to properly detect the PDCH and recover the transmitted data packet. Using the PDCCH to provide these parameters, however, has several disadvantages. Firstly, using the PDCCH contributes to the total interference level within a cell and therefore reduces the uplink capacity. Secondly, in order to achieve a certain frame error rate (e.g., an order of magnitude smaller than a PDCH target frame error rate), the PDCCH needs to be transmitted at a sufficiently high power level, which further degrades uplink capacity. If the PDCCH is not transmitted at a high enough power level, then an error in detecting the transmitted SPID, for example, can have a deleterious effect on the latency in recovering the PDCH. For example, if the base station detects the PDCCH and it indicates an SPID of 0 and a CRC fail results in decoding the PDCH, the base station will not send an ACK and will wait to receive the next subpacket from the mobile terminal. If the PDCCH associated with that next received subpacket indicates an SPID of 2, an error has occurred somewhere because the next subpacket should have an SPID of 1. In fact, the only way that the PDCCH for the next received subpacket could properly indicate an SPID of 0 would be if the mobile terminal had erroneously detected an ACK when base station had in fact sent nothing, and the mobile terminal in response to that detected ACK had transmitted the first subpacket of the next data packet. The probability, however, of detecting an ACK when the base station had in fact sent nothing is low if the downlink ACK channel is reliable. Thus, when an SPID is received in error, the transmitted information on the PDCCH has likely been corrupted. The base station in detecting the received PDCCH, however, only looks at the information contained in the currently received PDCCH and not simultaneously at previous ones and thus is unable to detect that something is in error. Thus, when it receives a PDCCH with an SPID of 2, it will incorrectly combine the soft metrics in the currently received subpacket with the soft metrics in the two previously received subpackets, resulting in a CRC fail on the reconstructed data packet. As a result, extra latency is added to the recovery of the PDCH since the data packet will likely have to be retransmitted in its entirety again. In order to have a negligible impact on system throughput, the probability of incorrectly receiving critical information in the PDCCH should be an order of magnitude smaller than the PDCH target error rate. To achieve this, the PDCCH power needs to be at a sufficiently high level, which as aforenoted, results in a degradation in uplink capacity.

A methodology of detecting the uplink packet data channel that is less reliant on receiving a high-powered supplemental packet data control channel is thus desirable.

SUMMARY OF THE INVENTION

In accordance with an embodiment of the present invention, reliance on the parameter values transmitted on the PDCCH to properly detect the PDCH at the base station receiver is reduced by using different possible discrete values for at least one of the parameters and determining if a data packet derived from the PDCH detected under one of the possible values of the at least one parameter produces a detected data packet that passes the CRC check. If a data packet derived from the received PDCH using a possible parameter value passes the CRC check, then the data packet is delivered to the output and an ACK is transmitted back to the mobile terminal.

In a first embodiment, reliance on the PDCCH is eliminated by detecting the PDCH based on all possible combinations of PDCCH parameter values that are supported by the base station. As aforenoted, these parameters include the SPID, the size of the input data packet, and an indication of PDCH-to-PICH power ratio. Only specific discrete values of these parameters are supported. Further, only a subset of all combinations of these discrete values may be supported by the base station and mobile terminal. By assuming each of the allowed and supported combinations of these values, and decoding the received PDCH input in accordance with each of these combinations, a determination is made if any such combination of these parameters yields a detected data packet that results in a CRC pass. If a resultant data packet can be unambiguously attributed to one combination of parameters or more than one combination that have the same packet length and SPID number, then that data packet is delivered to the output and an ACK is sent to the mobile terminal. In this embodiment, since the PDCCH is not relied on at all for PDCH processing at the mobile terminal, the base station can instruct the mobile terminal to set its PDCCH to PICH power ratio to zero, thereby totally precluding any deleterious effect on uplink capacity by the PCDDH.

In a second embodiment, the PDCCH is used and detected and at least one of the transmitted parameters contained within the PDCCH about the PDCH are used to detect the PDCH data while at least one other parameter is allowed to assume each of its possible discrete values. A data packet is then separately detected using the PDCCH-detected parameter value or values and each discrete value or combination of values of the other parameter or parameters. A CRC check is then performed on the resultant detected data packet under each discrete value or combination of values of that parameter or parameters in order to determine if using such parameter value or values in combination with the other parameter value or values detected from the PDCCH produces an output data packet that yields a CRC pass. Specifically, the information in the received PDCCH relating to the parameters of packet length and PDCH-to-PICH power ratio are used to detect the PDCH together with each possible discrete SPID. Since, as aforenoted, in 3GPP2, SPID has three possible values, the PDCH is detected separately for each of the three SPID values and a determination is made whether the resultant detected data packet passes the CRC check. If it does, the detected data packet is delivered to the output.

BRIEF DESCRIPTION OF THE DRAWING

FIG. 3 is a table showing the different modes of operation of uplink transmission of high-speed data as determined in accordance with PDCCH parameter values of data packet length, PDCH-to-PICH power ratio, and subpacket identity (SPID);

DETAILED DESCRIPTION

Figure 1:
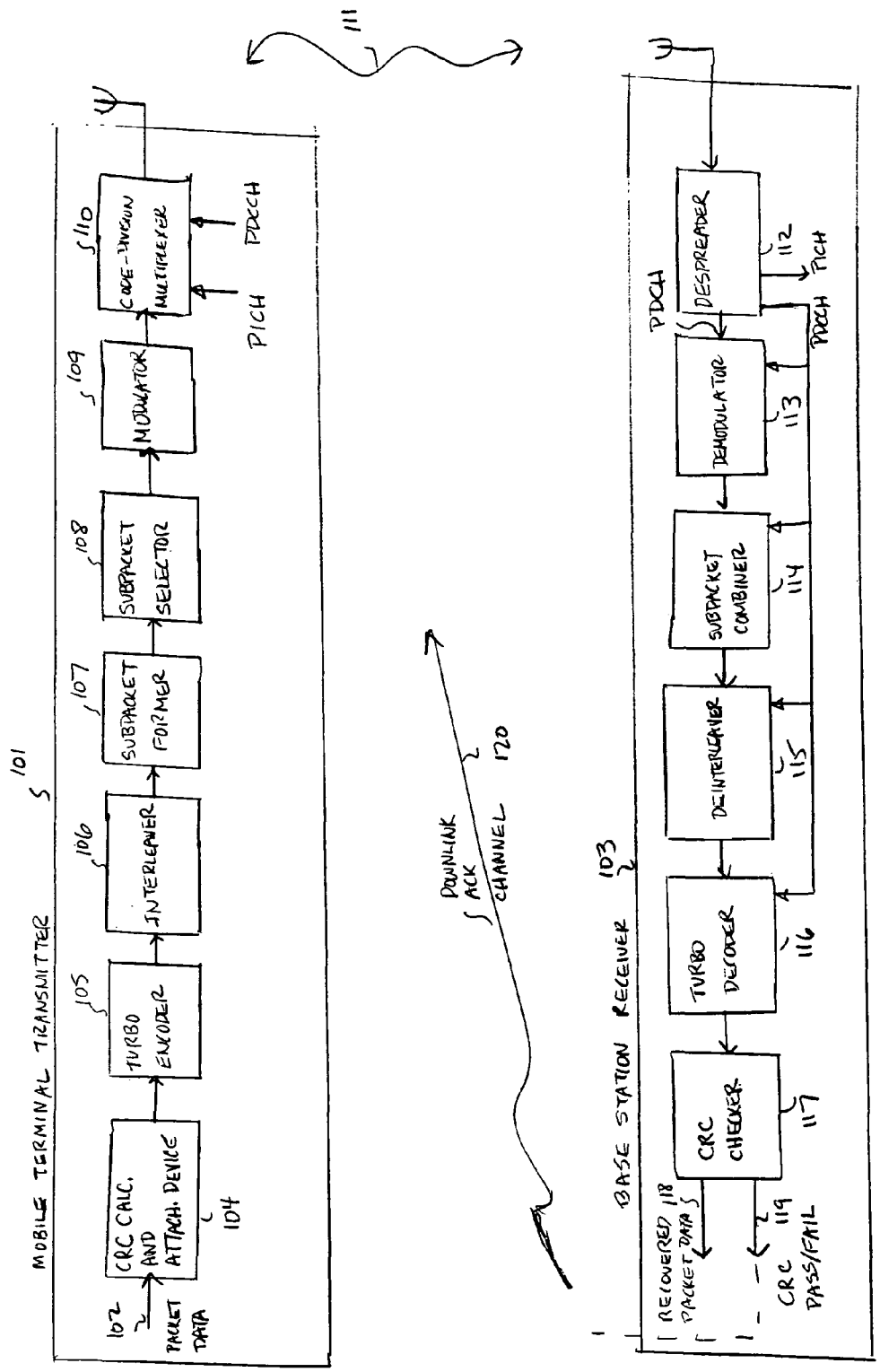
FIG. 1 is a block diagram showing prior art processing of uplink-transmitted high-speed data packets by a mobile terminal transmitted to a base station receiver wherein the received PDCCH is used at the base station to detect the PDCH data.

With reference to the block diagram in FIG. 1, prior art uplink high speed PDCH processing in accordance with 3GPP2 standards is illustrated. At the mobile terminal transmitter 101, a data packet at input 102 to be transmitted uplink via the PDCH to the base station receiver 103 is processed by a CRC calculation and attachment device 104. Based on the input data packet, device 104 attaches CRC bits to the bits in the data packet and the combined bits are coded by a turbo encoder 105, a device well known in the art. An interleaver 106 interleaves the encoded data to combat a correlated fading channel, and subpacket former 107 re-organizes the interleaved data into three subpackets. The bits within each subpacket are sufficient to allow a receiver to reconstruct the data packet at the input 101. The rules for forming the subpackets for each input data packet are known to the mobile terminal transmitter 101 and the base station receiver 103 once the data packet size is known. The subpackets, numbered 0 to 2, can be overlapped and all subpackets have the same size.

Figure 2:
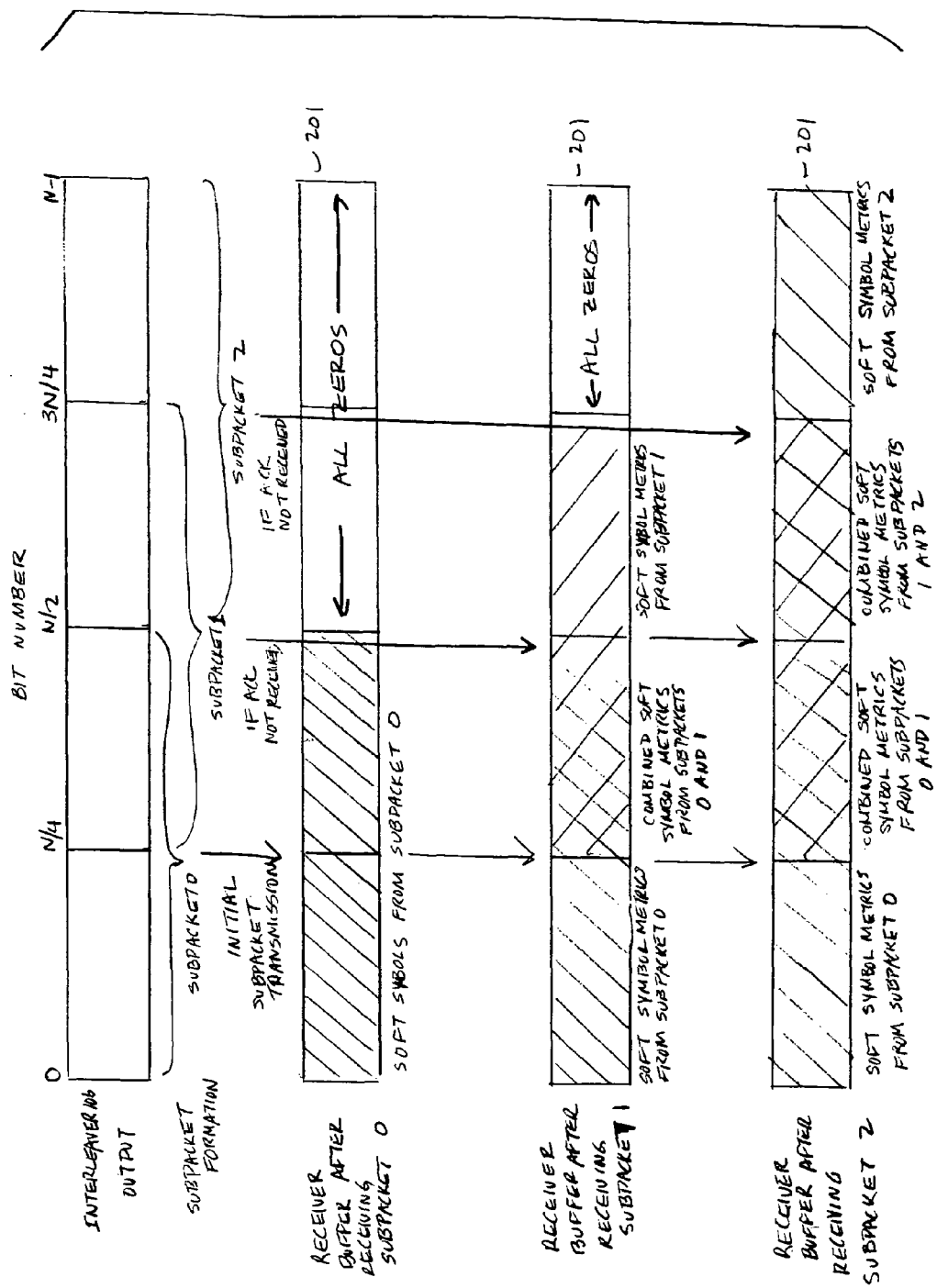
FIG. 2 illustrates the processing of overlapping subpackets received by the base station receiver in the system in FIG. 1.

FIG. 2 shows the N-bit output of interleaver 106 and the exemplary formation of overlapping subpackets 0, 1 and 2, each of length N/2. Subpacket 0 starts with bit 0 and extends to bit N/2-1, with subpacket 1 starting at bit N/4 and extending to bit 3N/4-1 overlapping with subpacket 0 as shown. Subpacket 2 starts at bit N/2 and extends to bit N-1, overlapping with subpacket 1 as shown. Starting with subpacket 0, subpacket selector 108 selects a subpacket, which is modulated by modulator 109 and code-division-multiplexed with the PICH and PDCCH by CDM multiplexer 110 for transmission over propagation channel 111. The number of subpackets, three, is the maximum number of attempts that are made at the physical layer to transmit a data packet.

As previously noted, in the 3GPP2 system subpacket formation is dependent on data packet size. Once the data packet size is specified, subpacket formation is known. The maximum number of transmissions for a data packet, three, is also a fixed parameter. In order to detect the PDCH at the base station receiver the data packet size, the subpacket number, SPID, being transmitted and the PDCH-to-PICH power ratio are transmitted by the PDCCH at the same time and code-division-multiplexed with the PDCH subpacket show information it is carrying.

At base station receiver 103, despreader 112 demultiplexes the received CDM-ed signal generating the modulated PDCH, the PDCCH and the PICH. Demodulator 113, using the packet size information in the PDCCH demodulates the PDCH to generate soft symbol metrics for the PDCH. Subpacket combiner 114, using the packet size and the SPID from the PDCCH, then performs the reverse function of subpacket former 107 on these soft symbol metrics. Combiner 114 places each symbol at a bit position corresponding to the output of the interleaver 106 in mobile terminal transmitter 101. If overlapped data has been transmitted, combining is also performed by combiner 114 on soft symbols corresponding to the overlapped bits. The resultant metrics are then passed through deinterleaver 115, which also uses the packet size in the PDDCH as an input. Turbo decoder 116, using the packet size and the PDCH-to-PICH power ratio provided via the PDCCH, outputs a decoded block of bits comprising a data part and a CRC part. A CRC check 117 then checks to see whether the CRC calculated on the data part of the decoded data block at the output of turbo decoder 116 matches the CRC part. If it does, the data part is outputted as the recovered packet data on output 118 and a CRC pass is outputted on output 119. That CRC pass is transmitted as an ACK signal on downlink ACK channel 120 to mobile terminal transmitter 101. If a CRC fail is generated by the CRC checker 117, then nothing is transmitted back to the mobile terminal transmitter 101.

At mobile terminal transmitter 101, when an ACK is detected, the transmission is considered successful and a next packet to transmit is received from the higher layer on input 102. If no ACK is received by mobile terminal transmitter 101 over downlink ACK channel 120, then the mobile terminal does not receive any new data packet from the higher layer and now transmits subpacket 1 from the same original data packet. When subpacket 1 is received by base station receiver 103, it is despread and demodulated to generate soft symbol metrics. Subpacket comber 114 performs the reverse function of subpacket former 107, but combines the received soft symbol metric now received for subpacket 1 with the previously received soft symbol metrics for subpacket 0, where each symbol from subpackets 0 and 1 is placed at the corresponding bit positions corresponding to the output of interleaver 106 at the mobile terminal transmitter 101. If overlapped data is transmitted, combining is also performed on soft symbols corresponding to overlapped bits. As with subpacket 0, the resultant metrics are deinterleaved, turbo decoded, and CRC checked. If the CRC check results in a pass, then an ACK is sent downlink to the mobile terminal transmitter 101 and a new packet is inputted from the higher layer. If a CRC fail results again, then the base station receiver 103 sends nothing and a last attempt to transmit the current packet via transmission of subpacket 2 is made by the mobile terminal transmitter. Subpacket combining by combiner 114 is now performed over both of the previously received subpackets 0 and 1 with the now received subpacket 2.

With reference again to FIG. 2, the processing at the base station of the received subpackets is shown via the sequentially received subpackets 0, 1 and 2 that are stored in an N-bit receiver buffer 201. As noted, after subpacket 0 is received, its soft symbol metrics are stored in bit positions 0-N/2-1 of buffer 201. When subpacket 1 is received, its received soft symbol metrics are stored in bit positions N/4-3N/4-1, with the soft symbol metrics in bits positions N/4-N/2-1 being combined with the soft symbol metrics received from subpacket 0, as shown in FIG. 2. When subpacket 2 is received, the received soft symbol metrics are stored in bit positions N/2-N-1, with the soft symbol metrics in bit positions N/2-3N/4-1 being combined the soft symbol metrics from subpacket 1.

In the first embodiment of the present invention, receipt of the information in the PDCCH is not relied on at all. In fact the PDCCH-to-PICH power ratio is a programmable parameter that is specified by the base station and can be set to zero so that it is not transmitted by the mobile terminal thereby precluding any deleterious effect on the uplink capacity.

FIG. 3 shows a table containing the possible parameter value combinations of packet size, subpacket number (SPID), and whether the PDCH-to-PICH power ratio is in either a "normal" or a "boost" condition. Since not all possible combinations of parameter values are supported, there are 64 possible modes of operation in accordance with 3GPP2 standards, with four of these modes reserved for future use. The 64 modes are indexed between 0 and 63, with corresponding binary indexes between 000000 and 111111. Each 6-bit index represents the 6-bit PDCCH transmitted in those embodiments where the PDCCH is transmitted by the mobile terminal to the base station in conjunction with the PDCH. Since only 60 modes are currently designated for use, the only combination of packet size, SPID, and PDCH-to-PICH power ratio are those with decimal indexes of 0 to 59.

Figure 4:
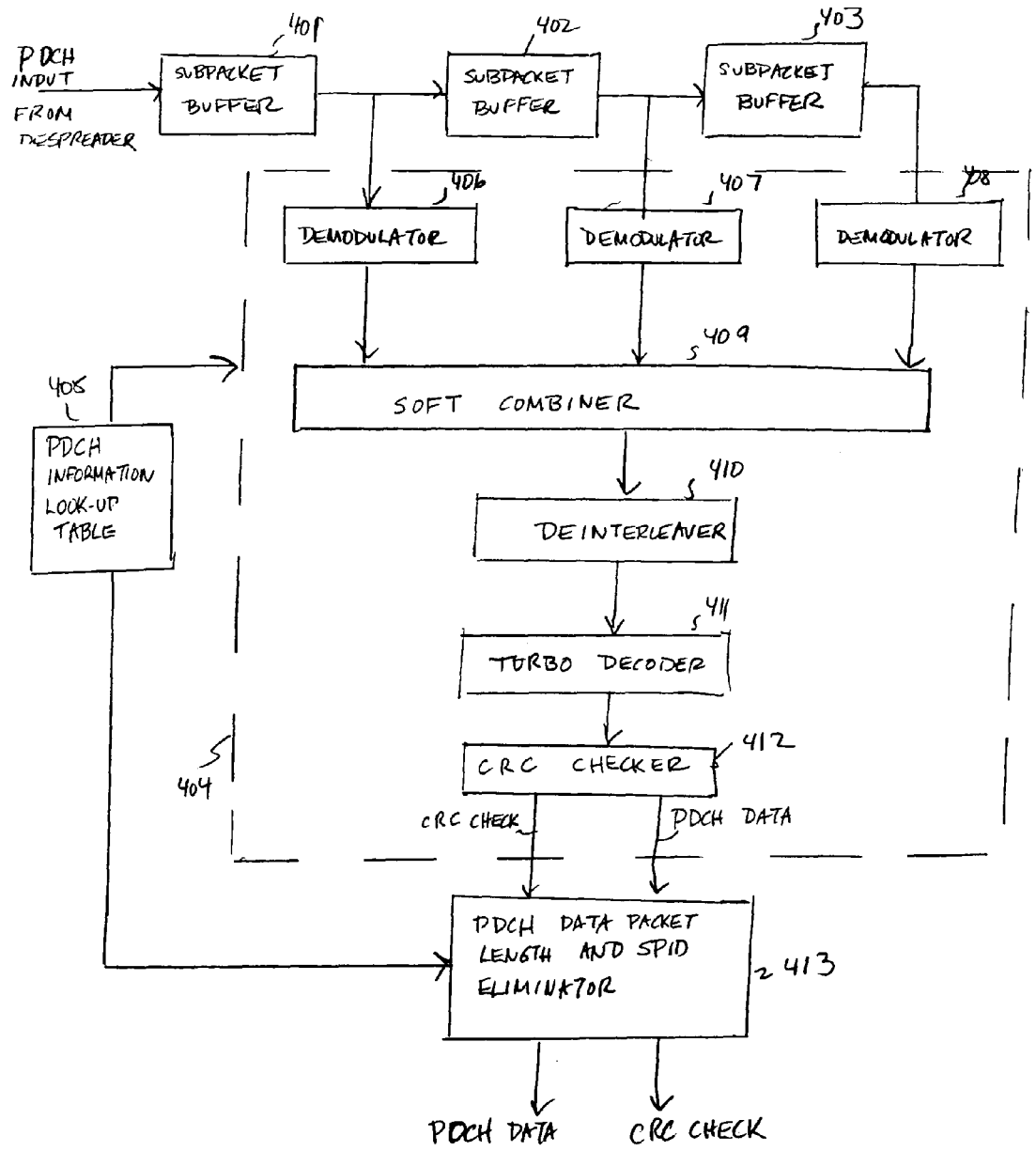
FIG. 4 is a block diagram showing a system incorporating a first embodiment of the present invention in which the PDCCH is not used to detect the PDCH.

In the first embodiment each of the possible 60 modes are "tested" against the received PDCH to determine if using the parameter values associated with a particular index produces an output data packet that passes a CRC check. Since all PDCH encoder packets are protected by a 16-bit CRC, perfect error detection can be assumed as compared with a target PDCH frame error rate. In this embodiment, functionally illustrated in FIG. 4, at the base station, the PDCH subpacket output of the despreader (not shown) is inputted to subpacket buffer 401. Since, depending on a subpacket's SPID, PDCH detection may be dependent on the previous one or two received subpackets, subpacket buffers 402 and 403 store the previous and previous received PDCH subpackets, respectively. The functions performed within dotted box 404 are performed for each of the active modes. The parameter values for each such mode are inputted by PDCH information look-up table 405 in which is stored the information indicated in the table in FIG. 3. The outputs of subpacket buffers 401, 402 and 403 are connected to demodulators 406, 407, and 408, respectively. Depending on the SPID of the active mode being tested, the soft symbol metrics at the outputs of demodulator 406, demodulators 406 and 407, or demodulators 406, 407 and 408 are soft combined by soft combiner 409. The combined soft symbol metrics are then deinterleaved by deinterleaver 410 and decoded by turbo decoder 411. A CRC check is then performed on the decoded data by CRC checker 412, which outputs a CRC pass or fail for each "tested" active mode and detected PDCH data. The results of the CRC test of the data detected under of each active mode are read into a PCDH data packet length and SPID eliminator 413. Eliminator 413 functions to eliminate multiple choices when the data detected under multiple active modes results in a CRC pass.

Figure 5:
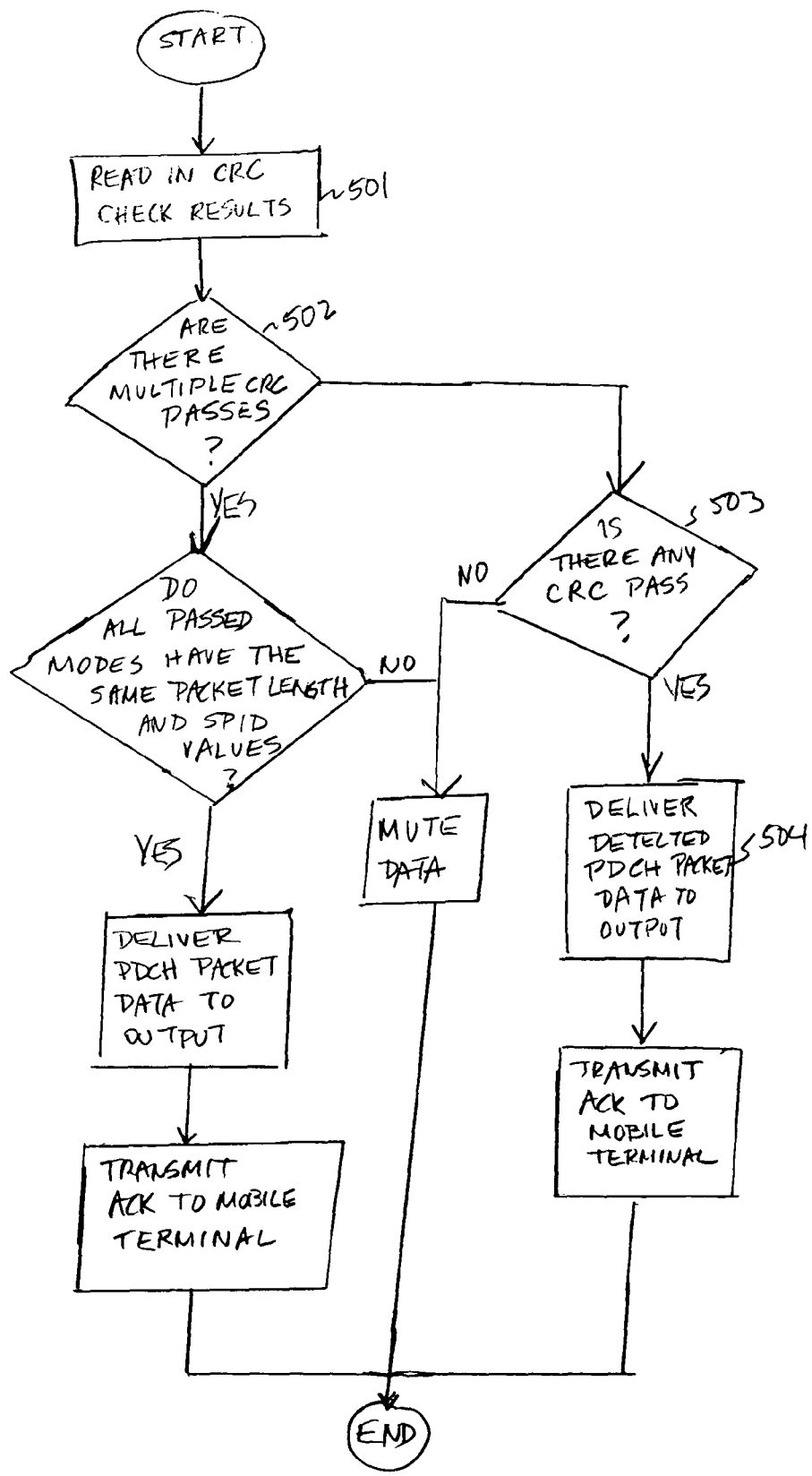
FIG. 5 is a flowchart that illustrates processing of detected PDCH data in accordance with its associated CRC in the embodiment of FIG. 4.

The flowchart in FIG. 5 illustrates the functions of eliminator 413. At step 501, the results of the CRC check for each of the tested active modes are read in. At step 502, a determination is made whether multiple CRC passes are present. If not, then at step 503, a determination is made whether the data detected under any active mode resulted in a CRC pass. If it did, at step 504, the PDCH data packet is delivered to the output and, at step 505, an ACK is transmitted to the mobile terminal. If, at step 502, no active mode resulted in a CRC pass of the detected data, then, at step 506, the data is muted and no ACK is sent to the mobile terminal. If, at step 502, multiple CRC passes are present, a determination is made, at step 507, whether all of the passed modes have the same packet length and SPID parameter values. If they don't, then, at step 506, the data is muted. If they all have the same packet length and SPID, then, at step 508, the PDCH packet is delivered to the output, and, at step 509, an ACK is sent to the mobile terminal.

The above-described embodiment would be most useful when only a subset of the active modes are supported in a system, as for example, 10 modes of the 60 possible modes indicated in the table of FIG. 3. This will avoid needed to make 60 runs of the decoder for each subpacket received, which would be computationally complex.

If power is available for the transmission of the PDCCH, but not at a sufficiently high level to guarantee an error performance that is an order of magnitude better than the desired PDCH error performance, then the above-described embodiment can be simplified so as to use some of the parameter values in the received and detected PDCCH while at least one of the other parameters is cycled through each of its possible values and a CRC check is performed on the detected PDCH packet for each such parameter value.

Figure 6:
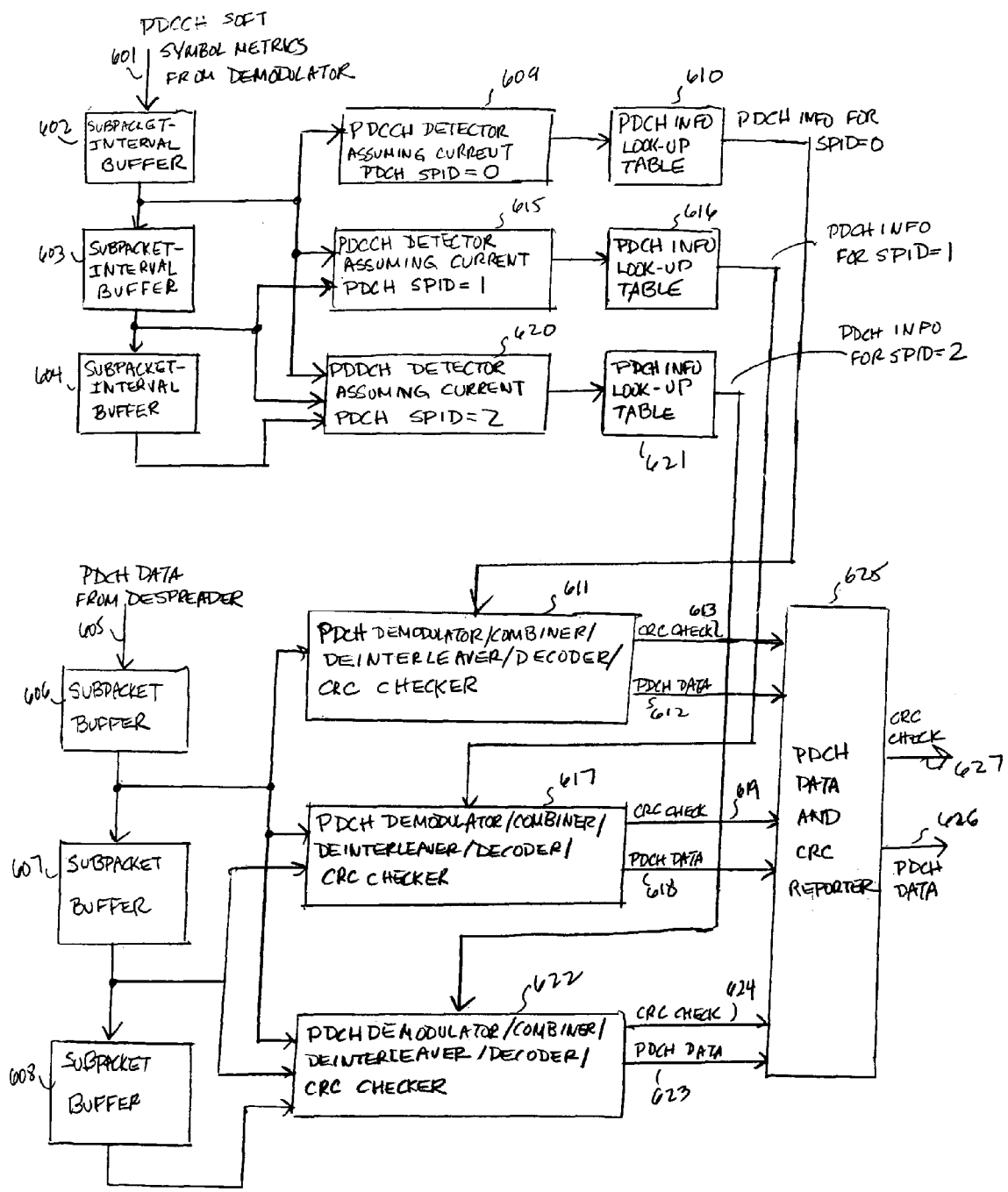
FIG. 6 is a block diagram showing a system incorporating a second embodiment of the present invention in which the PDCCH is used in conjunction with each possible SPID value to detect the PDCH.
Figure 7:
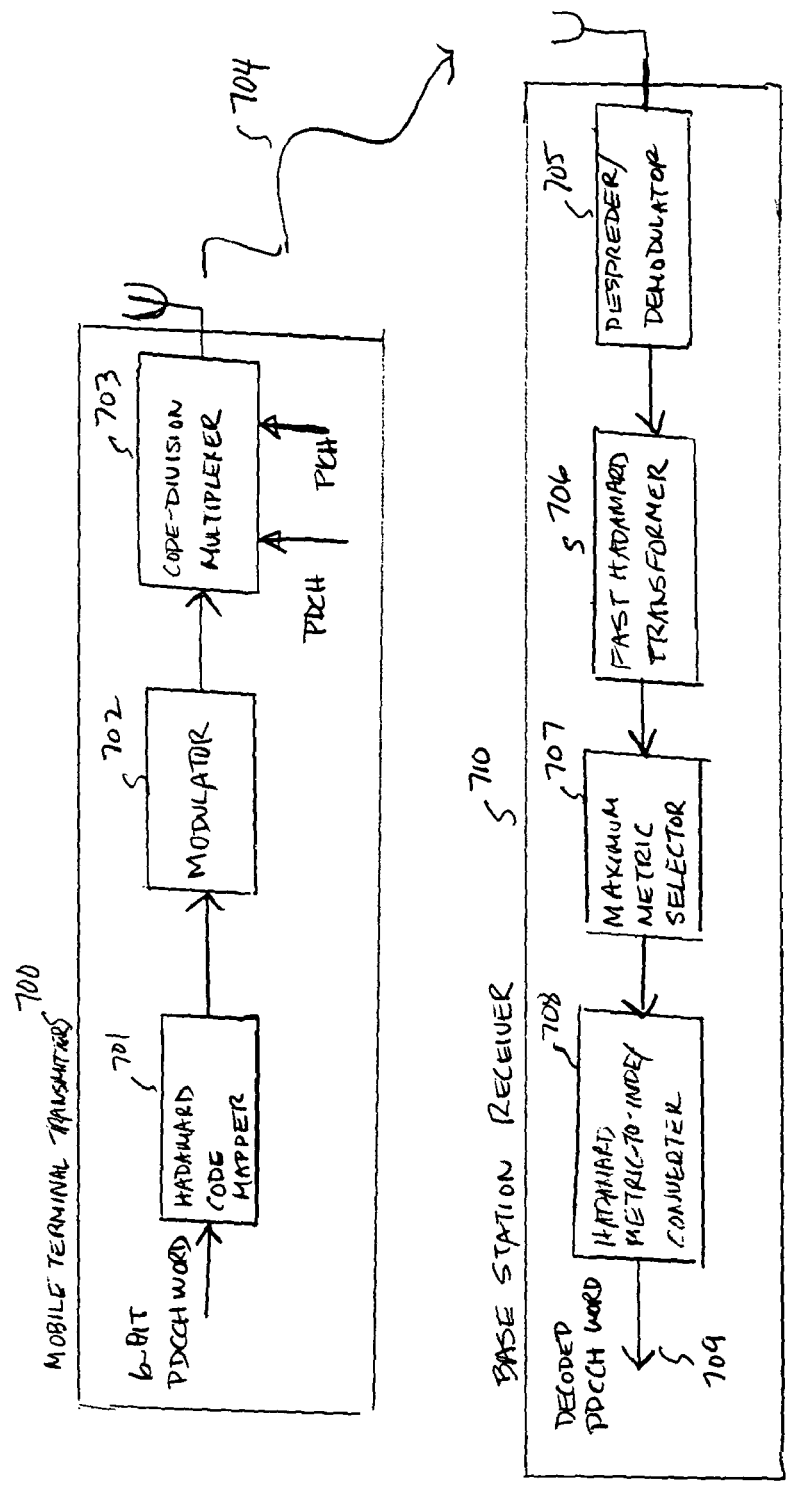
FIG. 7 functionally illustrates PDCCH processing performed at both the mobile terminal transmitter and at the base station receiver.

With reference to FIG. 6, a simplified embodiment is illustrated in which for each received subpacket the values of the data packet size and the PDCH-to-PICH power ratio parameters are determined from the received PDCCH while the SPID parameter takes on each possible value for detecting the PDCH and deriving a PDCH subpacket, which CRC is then checked. Before describing the operation of the PDCCH and PDCH processing performed by the base station receiver in FIG. 6, processing of the PDCCH will be first described in conjunction with FIG. 7, which functionally illustrates PDCCH processing performed at both the mobile terminal and at the base station. At the mobile terminal transmitter 700, a 64-Hadamard code mapping is performed by Hadamard code mapper 701 on the 6-bit PDCCH word for the active mode associated with the present PDCH subpacket being transmitted, which is defined by one of the PDCCH binary indexes in the table in FIG. 3. This encoding results in a 64-bit Hadamard code whose index (0-63) matches the 6-bit input. The 64 coded bits are modulated by modulator 702 and code-division-multiplexed with the PDCH and the PICH by CDM multiplexer 703 for transmission over the propagation channel 704. At the base station receiver 710, after being despread and demodulated by despreader/demodulator 705, the resultant 64 soft symbol metrics are passed through a fast Hadamard transformer 706, which performs a 64-point fast Hadamard transform (64-FHT) to produce an output consisting of the metrics associated with the Hadamard codeword, with one metric for each index. The maximum metric out of a subset of the 64 indexes is then selected by maximum metric selector 707 where the subset contains the indexes that can possibly have been used for the PDCCH. Since there are 60 possible indexes in use, maximization is performed over the 60 metrics with indexes from 0 to 59 if there is no a priori knowledge of the PDCCH word having been sent. Hadamard metric-to-index converter 708 converts the maximum metric to its corresponding index to produce as the decoded PDCCH word on output 709 the Hadamard index associated with this maximum value Hadamard metric.

With reference again to FIG. 6, the base station receiver first performs PDCCH processing to determine from the demodulated PDCCH soft symbols on input 601, the PDCH information for an SPID of 0, 1 and 2. As will be described, in determining the PDCH information for each SPID value, the PDCCH soft symbols associated with the current PDCH data, and the PDCCH soft symbols from the two previous PDCH data are used, depending on the assumed SPID. Thus, the PDCCH soft symbols associated with the current PDCH data are stored in a subpacket-interval buffer 602 while the soft symbols associated with the previous PDCH data and the previous PDCH data are stored in buffers 603 and 604, respectively.

From the despread PDCH subpacket data on input 605, the PDCH data is detected for an assumed SPID of 0, 1 and 2, using the corresponding PDCH information derived from the PDCCH soft symbol metrics for each SPID. Since the PDCH data from the currently received PDCH may need to be combined with previously received PDCH data depending on the assumed SPID, the current PDCH data is stored in subpacket buffer 605 while the previous PDCH data and previous PDCH data are stored in subpacket buffers 607 and 608, respectively.

In testing the received PDCH on the assumption that its SPID=0, PDCCH detector 609 detects the PDCCH soft symbol metrics associated with the current subpacket that are stored in a subpacket buffer 602. Detector 609, assuming the current PDCH to have an SPID of 0, performs a 64-FHT followed by a search for the maximum metric over only the 20 PDCCH indexes in the table in FIG. 3 in which SPID=0 (i.e., those having a PDCCH index of 0 through 10, and 33 through 41). The PDCCH index associated with that maximum metric is outputted and used by PDCH info look-up table 610 to determine the PDCH information to be used for SPID=0. That information includes the data packet size parameter value as well as the normal or boost PCDH to PICH power ratio parameter value. PDCH demodulator/subpacket combiner/deinterleaver/decoder/CRC checker 611 uses that PDCH information to perform PDCH detection on the current subpacket data stored in subpacket buffer 606. The detected PDCH data and the pass/fail result of the CRC check performed on that data are outputted on outputs 612 and 613, respectively.

In testing the received PDCH on the assumption that its SPID=1, the current received PDCH and associated PDCCH and the previous received PDCH and associated PDCCH are used in decoding both the PDCH and PDCCH. In decoding the PDCCH, PDCCH detector 615 separately performs a 64-FHT on the previous PDCCH soft symbols stored in buffer 603 and the current PDCCH soft symbols stored in buffer 602. The 20 PDCCH output metrics associated with the previous PDCH having indexes associated with SPID=0 (indices 0-10 and 33-41 from the table in FIG. 3), and the 20 PDCCH output metrics associated with the current PDCH having indexes associated with SPID=1 (indices 11-21 and 42-50) are combined. The combining is an element-by-element summation on the two 20-element vectors for elements that represent the same PDCH mode (i.e., having the same data packet size and PDCH-to-PICH power ratio, but with different SPIDs). Once the element-by-element summations are formed, the maximum metric sum is determined and the PDCCH index associated with SPID=1 is outputted and used as an input to the PDCH info look-up table 616 to determine the PDCH information (i.e., the parameter values) to be used for SPID=1. That information is then used as input to the PDCH demodulator/subpacket combiner/deinterleaver/decoder/CRC checker 617. The latter, using the PDCH information for SPID=1, combines the despread PDCH data from the current subpacket stored in buffer 606 with the despread PDCH data from the previous subpacket stored in subpacket buffer 607 to detect the PDCH data and perform a CRC check thereon. That detected PDCH data and the pass/fail result of the CRC check are outputted on outputs 618 and 619, respectively.

In testing the received PDCH on the assumption that its SPID=2, the current received PDCH and associated PDCCH and the two previously received PDCHs and associated PDCCHs are used in decoding both the current PDCH and PDCCH. In decoding the current PDCCH, PDCCH detector 620 separately performs a 64-FHT on the two previous PDCCH soft symbols stored in buffers 603 and 604 and the current PDCCH soft symbols stored in buffer 602. The two 20 PDCCH output metrics associated with the two previous PDCHs having indexes associated with SPID=1 (indices 11-21 and 42-50 from the table in FIG. 3) and SPID=0 (indices 0-10 and 33-41 from the table in FIG. 3), and the 20 PDCCH output metrics associated with the current PDCH having indexes associated with SPID=2 (indices 22-32 and 51-59) are combined. Once the element-by-element summations are formed, the maximum metric sum is determined and the PDCCH index associated with SPID=2 is outputted and used as an input to the PDCH info look-up table 621 to determine the PDCH information (i.e., the parameter values) to be used for SPID=2. That information is then used as input to the PDCH demodulator/subpacket combiner/deinterleaver/decoder/CRC checker 622. The latter, using the PDCH information for SPID=2, combines the despread PDCH data from the current subpacket with assumed SPID=2 stored in buffer 606 with the despread PDCH data from the two previous subpackets stored in subpacket buffers 607 and 608 to detect the PDCH data and perform a CRC check thereon. That detected PDCH data and the pass/fail result of the CRC check are outputted on outputs 623 and 624, respectively.

Figure 8:
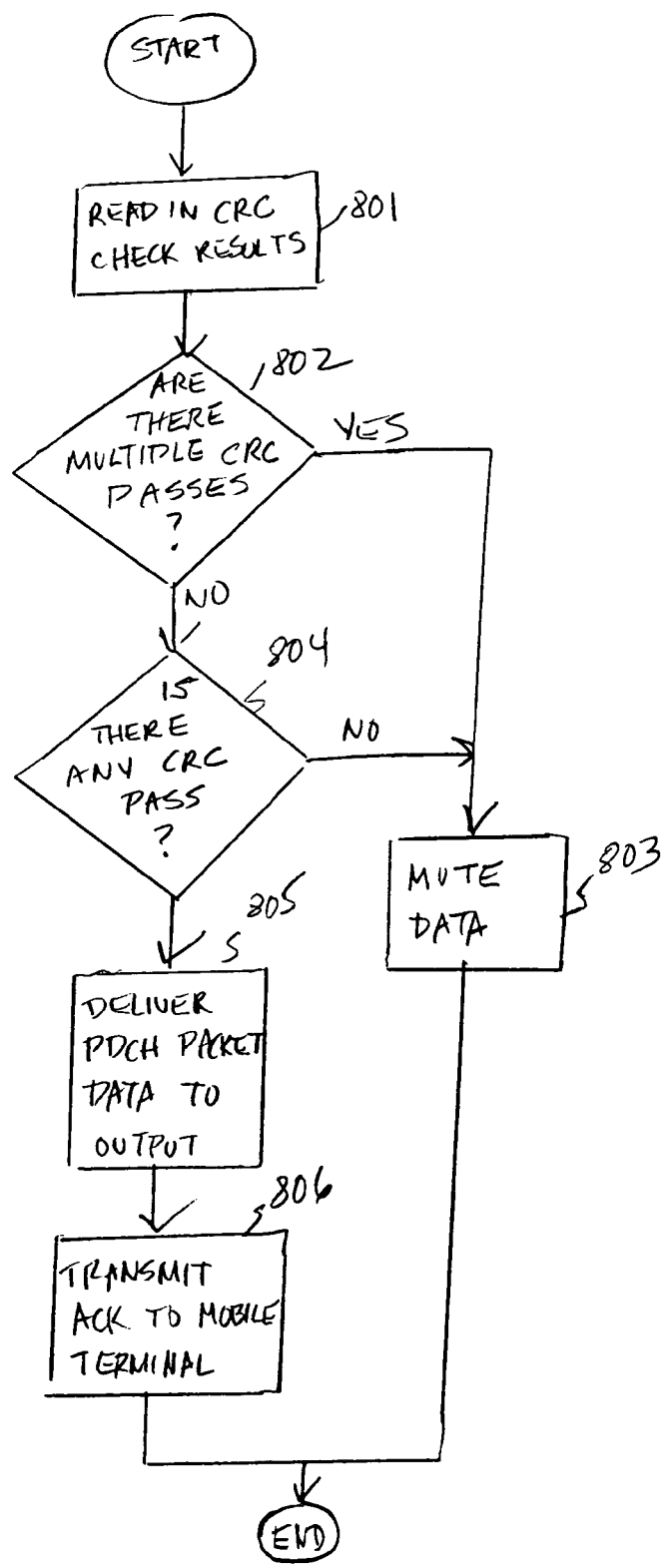
FIG. 8 is a flowchart that illustrates processing of detected PDCH data in accordance with its associated CRC in the embodiment of FIG. 6.

The detected PDCH data and associated CRC check derived under each of the three SPID parameter values are inputted to a PDCH data and CRC reporter 625, which decides from the three reported CRC checks whether or not to output one of the detected PDCH data and to send an ACK to the mobile terminal. A flowchart illustrating the functions of reporter 625 is shown in FIG. 8. At step 801, the CRC results for each of the three tested SPID values are read in. At step 802, a determination whether there were multiple CRC passes. If yes, then the data is muted at step 803 and is not outputted in FIG. 6 on PDCH output 626 and a CRC fail is outputted on check output 627. If there are not multiple CRC passes, then, at step 804, a determination is made whether a CRC pass resulted from any of the three tested SPID values. If not, then again, at step 803, the data is muted. If a CRC pass did result, at step 805, in FIG. 6, the detected PDCH packet under that SPID value is outputted on output 626 and a CRC pass is outputted on output 627. At step 806, that CRC pass on output 627 results in the transmission of an ACK by the base station to the mobile terminal.

While the particular invention has been described with reference to the illustrative embodiment, this description should not be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Although described in conjunction with 3GPP2 CDMA2000-1x EVDV/EVDO standards, the present invention could be implemented in any CDMA or non-CDMA type of wireless system, including, by way of example, UMTS and CDMA2000-1x EVDV. Further, the invention may be implemented in different locations, such as a base station (NodeB in UMTS terminology), a base station controller (a Radio Network Controller [RNC] in UMTS terminology) and/or a mobile switching center (a mobile service switching center [MSC] in UMTS terminology), a mobile terminal (UE in UMTS terminology), or elsewhere depending upon in what type of system the invention is employed. Furthermore, the invention can be implemented in any type of data communication system, wireless or hardwired, including an optical communications system, in which detection of transmitted data is dependent on one or more parameter values that are associated with the transmitted data. Moreover, processing circuitry required to implement and use the described invention may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention. It is therefore contemplated that the appended claims will cover any such modifications or embodiments as fall within the true scope of the invention.

The invention claimed is:

1. A method for receiving data transmitted in discrete data increments, wherein the data increments are transmitted via a first channel, and detection parameters for the data increments are transmitted via a second channel, the detection parameters including parameters related to packet length for the transmitted data increments, a ratio of data channel to pilot channel transmission power, and a sequence indicia for the transmitted data increments, the method comprising the steps of:

transmitting via the second channel the packet length and transmission-power ratio parameters corresponding to data increments transmitted on the first channel, wherein the sequence-indicia parameter corresponding to the transmitted data increments is not transmitted;

detecting ones of received data increments in accordance with values of received corresponding packet-length and transmission-power-ratio parameters and different assumed possible values of the non-transmitted sequence-indicia parameter;

determining for each different combination of received packet-length and transmission-power-ratio parameters and assumed sequence-indicia parameter value if the data detected in accordance with that assumed parameter value passes a CRC check; and if the data detected in accordance with an assumed sequence-indicia parameter value passes the CRC check, delivering that detected data to an output.

2. The method of claim 1 wherein the at least one parameter is a plurality of different parameters each having a plurality of possible discrete values, and the step of detecting the received data in accordance with different assumed possible parameter values is performed over at least some of the combinations of possible discrete values for each of the parameters.

3. The method of claim 2 wherein the received data is received in a subpacket on a packet data channel that is code-division multiplexed with a pilot channel, and the parameters comprise a transmitted packet size, a subpacket identity, and an indication of transmitted data channel-to-pilot channel power ratio.

4. The method of claim 3 wherein the step of detecting the received data in accordance with different assumed possible parameter values is performed over each supported combination of possible packet size, subpacket identity, and indication of transmitted data channel-to-pilot channel power ratio.

5. The method of claim 4 wherein if the data detected using more than one combination of values of packet size, subpacket identity, and indication of transmitted data channel-to-pilot channel power ratio passes the CRC check, then the detected data is delivered to the output only if each such combination has the same values of packet size and subpacket identity.

6. The method of claim 1 wherein the at least one parameter is a plurality of different parameters each having a plurality of possible discrete values and wherein the value of at least one of the parameters used in detecting the data is received in association with the received data, and the step of detecting the received data in accordance with different assumed possible parameter values is performed over at least some of the combinations of possible discrete values for each of the other parameters while using the value of the at least one received parameter.

7. The method of claim 6 wherein the received data is received in a subpacket on a packet data channel that is code-division multiplexed with a pilot channel and a packet data control channel over which is received the value of the at least one parameter, and the parameters comprise a transmitted packet size, a subpacket identity, and an indication of transmitted data channel-to-pilot channel power ratio.

8. The method of claim 7 wherein values of the transmitted packet size and the indication of transmitted data channel-to-pilot channel power ratio are received on the packet data control channel, and the step of detecting the received data in accordance with different possible parameter values is performed using each possible subpacket identity.

9. The method of claim 8 wherein the detected data is not delivered to the output if the data detected using more than one value of subpacket identity passes the CRC check.

10. A receiver for receiving data transmitted in discrete data increments, wherein the data increments are transmitted via a first channel, and detection parameters for the data increments are transmitted via a second channel, the detection parameters including parameters related to packet length for the transmitted data increments, a ratio of data channel to pilot channel transmission power, and a sequence indicia for the transmitted data increments, and further wherein the packet length and transmission-power ratio parameters corresponding to data increments transmitted on the first channel are transmitted via the second channel, and the sequence indicia parameter corresponding to the transmitted data increments is not transmitted, the receiver comprising:

detecting means for detecting ones of received data increments in accordance with values of received corresponding packet-length and transmission-power-ratio parameters and different assumed possible values of the non-transmitted sequence-indicia parameter; and means for determining for each different combination of received packet-length and transmission-power-ratio parameters and assumed sequence-indicia parameter value if the data detected in accordance with that assumed parameter value passes a CRC check, and if the data detected in accordance with an assumed parameter value passes the CRC check, delivering that detected data to an output.

11. The receiver of claim 10 wherein the at least one parameter is a plurality of different parameters each having a plurality of possible discrete values, and the detecting means detects the received data in accordance with different assumed possible parameter values using at least some of the combinations of possible discrete values for each of the parameters.

12. The receiver of claim 11 wherein the received data is received in a subpacket on a packet data channel that is code-division multiplexed with a pilot channel, and the parameters comprise a transmitted packet size, a subpacket identity, and an indication of transmitted data channel-to-pilot channel power ratio.

13. The receiver of claim 12 wherein the detecting means detects the received data in accordance with different assumed possible parameter values using each supported combination of possible packet size, subpacket identity, and indication of transmitted data channel-to-pilot channel power ratio.

14. The receiver of claim 13 wherein if the data detected using more than one combination of values of packet size, subpacket identity, and indication of transmitted data channel-to-pilot channel power ratio passes the CRC check, then the detected data is delivered to the output only if each such combination has the same values of packet size and subpacket identity.

15. The receiver of claim 10 wherein the at least one parameter is a plurality of different parameters each having a plurality of possible discrete values and wherein the value of at least one of the parameters used in detecting the data is received in association with the received data, and the detecting means detects the received data in accordance with different assumed possible parameter values using at least some of the combinations of possible discrete values for each of the other parameters while using the value of the at least one received parameter.

16. The receiver of claim 15 wherein the received data is received in a subpacket on a packet data channel that is code-division multiplexed with a pilot channel and a packet data control channel over which is received the value of the at least one parameter, and the parameters comprise a transmitted packet size, a subpacket identity, and an indication of transmitted data channel-to-pilot channel power ratio.

17. The receiver of claim 16 wherein values of the transmitted packet size and the indication of transmitted data channel-to-pilot channel power ratio are received on the packet data control channel, the detecting means detecting the received data in accordance with different possible parameter values using each possible subpacket identity.

18. The receiver of claim 17 wherein the detected data is not delivered to the output if the data detected using more than one value of subpacket identity passes the CRC check.

19. A method for receiving data transmitted in discrete data increments comprising the steps of:
  detecting ones of received data increments in accordance with the value of at least one parameter that is associated with detection of the data, the at least one parameter having not been transmitted with the data increments and having a plurality of possible discrete values;
  detecting each received data increment in accordance with different assumed possible values of the non-transmitted parameter;
  determining for each different assumed parameter value if the data detected in accordance with that assumed parameter value passes a CRC check; and
  if the data detected in accordance with an assumed parameter value passes the CRC check, delivering that detected data to an output;
  wherein the step of detecting the received data in accordance with different assumed possible parameter values is performed over each supported combination of possible packet size, subpacket identity, and indication of transmitted data channel-to-pilot channel power ratio;
  and further wherein if the data detected using more than one combination of values of packet size, subpacket identity, and indication of transmitted data channel-to-pilot channel power ratio passes the CRC check, then the detected data is delivered to the output only if each such combination has the same values of packet size and subpacket identity.

* * * * *